United States Patent
Hou et al.

(10) Patent No.: US 10,209,601 B2
(45) Date of Patent: Feb. 19, 2019

(54) DISPLAY SUBSTRATE AND DRIVING METHOD THEREOF, AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Qingna Hou, Beijing (CN); Weifan Yang, Beijing (CN); Lan Feng, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 28 days.

(21) Appl. No.: 15/508,817

(22) PCT Filed: Sep. 23, 2016

(86) PCT No.: PCT/CN2016/099917
§ 371 (c)(1),
(2) Date: Mar. 3, 2017

(87) PCT Pub. No.: WO2017/118106
PCT Pub. Date: Jul. 13, 2017

(65) Prior Publication Data
US 2018/0113367 A1    Apr. 26, 2018

(30) Foreign Application Priority Data
Jan. 8, 2016 (CN) .......................... 2016 1 0009564

(51) Int. Cl.
*G02F 1/15* (2006.01)
*G09G 3/00* (2006.01)
(Continued)

(52) U.S. Cl.
CPC ................ *G02F 1/163* (2013.01); *G02F 1/15* (2013.01); *G09G 3/00* (2013.01); *G09G 3/3413* (2013.01);
(Continued)

(58) Field of Classification Search
CPC . G02F 1/15; G02F 1/153; G02F 1/157; G02F 1/163; G02F 2001/1635;
(Continued)

(56) References Cited

U.S. PATENT DOCUMENTS 9,214,133 B2 * 12/2015 Chen ......................... G09G 5/02
9,361,841 B2 *  6/2016 Liao ..................... G09G 3/3696
(Continued)

FOREIGN PATENT DOCUMENTS

CN          101510389 A      8/2009
CN          102667914 A      9/2012
(Continued)

OTHER PUBLICATIONS

Fourth Chinese Office Action dated Mar. 31, 2017; Appln. No. 201610009564.0.
(Continued)

*Primary Examiner* — Loha Ben
(74) *Attorney, Agent, or Firm* — Ladas & Parry LLP

(57) ABSTRACT

Disclosed are a display substrate and a driving method thereof, and a display device. The display substrate includes a plurality of pixels, a data signal chip and a control unit. Each of the pixels includes a white sub-pixel; the data signal chip is for transmitting a set of data signals to the pixels, the set of data signals including data signals transmitted to the white sub-pixel; and the control unit controls the white sub-pixel to be in a dark state when the data signal chip transmits a predetermined set of data signals to the pixels. When the data signal chip transmits the predetermined set of data signals to the pixels, the display substrate controls the white sub-pixel to be in a dark state.

20 Claims, 2 Drawing Sheets

(51) Int. Cl.
*G09G 3/34* (2006.01)
*G09G 3/38* (2006.01)
*G02F 1/163* (2006.01)

(52) U.S. Cl.
CPC .............. *G09G 3/3433* (2013.01); *G09G 3/38* (2013.01); *G02F 2001/1635* (2013.01); *G02F 2201/121* (2013.01); *G02F 2201/44* (2013.01); *G02F 2201/52* (2013.01); *G09G 2300/0408* (2013.01); *G09G 2300/0452* (2013.01); *G09G 2320/0242* (2013.01)

(58) Field of Classification Search
CPC .... G02F 2201/121; G09G 3/003; G09G 3/20; G09G 3/2003; G09G 3/19; G09G 3/36; G09G 3/3406; G09G 3/34; G09G 3/3413; G09G 3/3607; G09G 3/3648; G09G 3/3659; G09G 3/3688; G09G 3/38; G09G 5/00; G09G 5/02; G09G 5/026; G09G 5/04; G09G 2300/0426; G09G 2300/0452; G09G 2320/0242; G09G 2320/029; G09G 2320/0295
USPC .... 359/245, 265, 267, 270, 275; 345/48, 49, 345/55, 84, 87, 88, 92, 105, 212, 215, 345/690, 691
See application file for complete search history.

(56) References Cited

U.S. PATENT DOCUMENTS

| | | | |
|---|---|---|---|
| 9,502,001 B2* | 11/2016 | Kim | G09G 5/10 |
| 10,074,321 B2* | 9/2018 | de Greef | G09G 3/348 |
| 2009/0207182 A1 | 8/2009 | Takada et al. | |
| 2012/0229529 A1 | 9/2012 | Tomizawa et al. | |
| 2012/0268357 A1 | 10/2012 | Shih et al. | |
| 2016/0019851 A1 | 1/2016 | Chen et al. | |

FOREIGN PATENT DOCUMENTS

| | | |
|---|---|---|
| CN | 102707510 A | 10/2012 |
| CN | 103631766 A | 3/2014 |
| CN | 203811955 U | 9/2014 |
| CN | 104078020 A | 10/2014 |
| CN | 104653512 A | 5/2015 |
| CN | 104965338 A | 10/2015 |
| CN | 105242447 A | 1/2016 |
| CN | 105467712 A | 4/2016 |
| JP | 11212060 A | 8/1999 |

OTHER PUBLICATIONS

International Search Report and Written Opinion dated Nov. 29, 2016; PCT/CN2016/099917.
Third Chinese Office Action dated Feb. 8, 2017; Appln. No. 201610009564.0.

* cited by examiner

DISPLAY SUBSTRATE AND DRIVING METHOD THEREOF, AND DISPLAY DEVICE

TECHNICAL FIELD

Embodiments of the present invention relate to a display substrate and a driving method thereof, and a display device.

BACKGROUND

With the increasing development of display technology, liquid crystal display (LCD) has become a display device of the mainstream owing to its advantages such as fast response, high integration, low power consumption and the like. A liquid crystal display device generally includes a liquid crystal display panel including an array substrate, an opposing substrate, and a liquid crystal layer sandwiched between the array substrate and the opposing substrate, and a backlight module, wherein the array substrate or the opposing substrate may be provided with a color filter layer to filter the light emitted from the backlight module, thereby achieving color display.

In the display field, a typical RGB (red, green, blue) structural pixel includes a red sub-pixel, a green sub-pixel, and a blue sub-pixel. In order to improve the brightness of the RGB (red, green, blue) structural pixel and reduce the power, a white sub-pixel is generally additionally provided in each pixel to form a pixel of a RGBW (red, green, blue, white) structure, i.e., the pixel of the RGBW (red, green, blue, white) structure includes a red sub-pixel, a green sub-pixel, a blue sub-pixel, and a white sub-pixel.

SUMMARY

The embodiments of the present invention provides a display substrate and a display device so as to solve the problem that the white sub-pixel in the RGBW (red, green, blue, white) structural pixel causes undesirable interference to the color displayed by the pixel.

At least one embodiment of the present invention provides a display substrate comprising: a plurality of pixels, each of the pixels comprising a white sub-pixel; a data signal chip configured to transmit a set of data signals to the pixels, the set of data signals comprising data signals transmitted to the white sub-pixel; and a control unit which controls the white sub-pixel to be in a dark state upon the data signal chip transmitting a predetermined set of data signals to the pixels.

For example, in the display substrate according to one embodiment of the present invention, each of the pixels further comprises a red sub-pixel, a green sub-pixel, and a blue sub-pixel, and the set of data signals further comprises data signals transmitted to the red sub-pixel, the green sub-pixel, and the blue sub-pixel, respectively.

For example, in the display substrate according to one embodiment of the present invention, upon the pixels receiving the predetermined set of data signals, the red sub-pixel, the green sub-pixel, and the blue sub-pixel emit mixed color light, and the white sub-pixel emits white light which causes the brightness of the mixed color light seen by the human eye to be less than the actual brightness of the mixed color light by a preset percentage.

For example, in the display substrate according to one embodiment of the present invention, the preset percentage includes 5%.

For example, in the display substrate according to one embodiment of the present invention, the control unit comprises: an electrochromic cell disposed corresponding to the white sub-pixel; and a control chip for acquiring the set of data signals transmitted to the pixels by the data signal chip, and controlling the electrochromic cell to be in an opaque state if the set of data signals is the predetermined set of data signals.

For example, in the display substrate according to one embodiment of the present invention, the electrochromic cell has the same shape and the same size as the white sub-pixel.

For example, in the display substrate according to one embodiment of the present invention, the control unit controls the electrochromic layer to be in a transparent state if the acquired set of data signals transmitted to the pixels by the data signal chip is not the predetermined set of data signals after the electrochromic layer has been maintained to be in the opaque state for a predetermined period of time.

For example, in the display substrate according to one embodiment of the present invention, the electrochromic cell comprises: a first electrode layer; an ion storage layer disposed on the first electrode layer; an electrolyte layer disposed on the ion storage layer; an electrochromic layer disposed on the electrolyte layer; and a second electrode layer disposed on the electrochromic layer.

For example, in the display substrate according to one embodiment of the present invention, upon the set of data signals transmitted to the pixels by the data signal chip being the predetermined set of data signals, the control unit applies a forward current to the first electrode layer and the second electrode layer so that the electrochromic layer is in an opaque state, and upon the acquired set of data signals transmitted to the pixels by the data signal chip being not the predetermined set of data signals after the electrochromic layer has been maintained to be in the opaque state for a predetermined period of time, the control unit applies a reverse current to the first electrode layer and the second electrode layer so that the electrochromic layer is in a transparent state.

For example, in the display substrate according to one embodiment of the present invention, the white sub-pixel comprises a pixel electrode and a common electrode, wherein the ion storage layer is disposed on the pixel electrode, the electrolyte layer is disposed on the ion storage layer, the electrochromic layer is disposed on the electrolyte layer, and the common electrode is disposed on the electrolyte layer.

For example, in the display substrate according to one embodiment of the present invention, the pixel electrode is also used as the first electrode layer, and the common electrode is also used as the second electrode layer.

For example, in the display substrate according to one embodiment of the present invention, the control unit comprises: a switch unit provided on a data line between the data signal chip and the white sub-pixel; and a control chip configured for detecting the set of data signals transmitted to the pixels by the data signal chip, and controlling the switch unit to be turned off if the set of data signals is the predetermined set of data signals.

For example, in the display substrate according to one embodiment of the present invention, the control unit controls the switch unit to be turned on if the set of data signals transmitted to the pixels by the data signal chip is not the predetermined set of data signals after the control unit has controlled the switch unit to be turned off for a predetermined period of time.

For example, in the display substrate according to one embodiment of the present invention, the switch unit comprises: a thin film transistor comprising a gate electrode, a source electrode and a drain electrode, wherein the gate electrode is connected to the control chip, and the source electrode and the drain electrode are respectively connected to the white sub-pixel and the data signal chip.

For example, in the display substrate according to one embodiment of the present invention, the control chip is integrated in the data signal chip.

For example, in the display substrate according to one embodiment of the present invention, the red sub-pixel, the green sub-pixel, and the blue sub-pixel emit mixed color light including light green light, yellow light or light blue light when the pixels receive the predetermined set of data signals.

At least one embodiment of the present invention provides a display device, comprising any of the display substrates as described above.

At least one embodiment of the present invention provides a driving method of a display substrate, wherein the display substrate comprises: a plurality of pixels, each of the pixels comprising a white sub-pixel; a data signal chip for transmitting a set of data signals to the pixels; and a control unit, the driving method comprising controlling the white sub-pixel to be in a dark state by the control unit upon the data signal chip transmitting the predetermined set of data signals to the pixels.

For example, in the driving method according to one embodiment of the present invention, upon the pixels receiving the predetermined set of data signals, the pixels emit mixed color light, and the white sub-pixel emits white light which causes the brightness of the mixed color light seen by the human eye to be less than the actual brightness of the mixed color light by a preset percentage.

For example, in the driving method according to one embodiment of the present invention, the preset percentage includes 5%.

Based on the technical solutions described above, when the data signal chip transmits a predetermined set of data signals to the pixels, the visual influence of the white sub-pixel on the mixed color light emitted by the red sub-pixel, the green sub-pixel and the blue sub-pixel can be avoided by controlling the white sub-pixel to be in a dark state, thereby ensuring the user's viewing effect.

BRIEF DESCRIPTION OF THE DRAWINGS

In order to clearly illustrate the technical solutions of the embodiments of the present invention, the drawings required to be used in the embodiments are briefly described below. Apparently, the drawings described below relate to only some embodiments of the present invention, and the other drawings can be obtained by a person of ordinary skill in the art without any creative labor based on these drawings.

Figure 1:
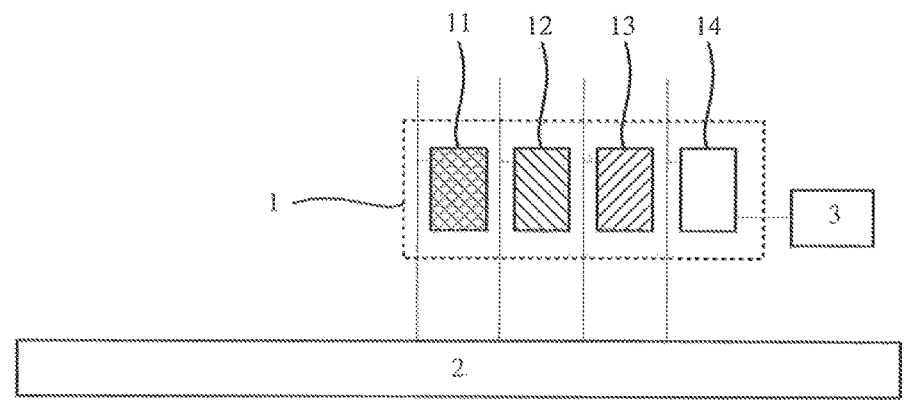
FIG. 1 is a structural schematic view of a display substrate according to an embodiment of the present invention.

REFERENCE SIGNS 1-pixel; 11-red sub-pixel; 12-green sub-pixel; 13-blue sub-pixel; 14-white sub-pixel; 2-data signal chip; 3-control unit; 31-switch unit; 32-control chip; 41-first electrode layer; 42-ion storage layer; 43-electrolyte layer; 44-electrochromic layer; 45-second electrode layer; 5-data line; 6-common electrode line; 8-pixel electrode; 9-common electrode; 100-base substrate.

DETAILED DESCRIPTION

To make clearer the objects, technical solutions and advantages of the embodiments of the present disclosure, a clear and full description of the technical solutions of the embodiments of the present disclosure will be made with reference to the accompanying drawings of the embodiments of the present disclosure. Apparently, the described embodiments are just part rather than all of the embodiments of the present disclosure. Based on the embodiments of the present disclosure as described, all the other embodiments obtained by a person of ordinary skill in the art, without any creative labor, fall within the scope of protection of the present disclosure. Besides, the thickness and shape of the film layers in the drawings do not reflect the true proportion, but aim to illustrate contents of the present invention.

Unless otherwise defined, the technical terms or scientific terms used in the present disclosure should be interpreted as generally understood by a person of ordinary skill in the art to which the present disclosure pertains. The terms "first", "second" and the like used in the present disclosure do not denote any order, quantity, or importance, but are used to distinguish different constituent parts. The terms "comprising", "including" or the like mean that the element or object preceding the word encompasses the element or object recited thereafter and its equivalents, and other elements or objects are not excluded. The terms "connected", "connection" and the like are not limited to physical or mechanical connection, but may include electrical connection, whether direct or indirect.

The inventors of the present invention have found in the study that: in the liquid crystal display device, because the white sub-pixel in the RGBW (red, green, blue, white) structural pixels does not filter the light emitted from the backlight module, the light at the corresponding position can be fully transmitted, thereby increasing brightness; RGBW (red, green, blue, white) structural pixels may lead to more light emitted into the eyes of a user compared with typical RGB (red, green, blue) structural pixels given that the backlight module light-emitting power is the same. Therefore, the liquid crystal display device using RGBW (red, green, blue, white) structural pixels can reduce power for display and thus reduces the power consumption of the liquid crystal display device on the premise that a liquid crystal display device using typical RGB structural pixels can be achieved. However, RGBW (red, green, blue, white) structural pixels also involve the problem of poor display in some parts, for example, in a color coordinate system, the pure white color coordinate is (0.33, 0.33). When the pixel displays a light color, i.e., the distance between the color coordinate of the color light and (0.33, 0.33) is less than a certain distance (for example, 0.02), because the brightness of the light emitted by the white sub-pixel is greater than the brightness of the color light, the brightness of the color light as perceived by the user upon viewing a screen is less than the brightness of the color light actually emitted by the pixel, and the variation in brightness will cause the color coordinate corresponding to the color as perceived by the human eye to be different from the color coordinate corresponding to the color light emitted by the pixel. In the color coordinate system, after the brightness perceived decreases, the color coordinate of the perceived color light shifts in a direction which is away from (0.33, 0.33) and which still belongs to the same or similar chromaticity. That is, the white light emitted by the white sub-pixel has a large influence on some mixed color light emitted by the RBG sub-pixel so that the brightness of the mixed color light perceived by the human eye is less than the actual brightness of the mixed color light emitted by the pixel.

Embodiments of the present invention provide a display substrate and a display device. The display substrate comprises: a plurality of pixels, each of which comprising a white sub-pixel; a data signal chip for transmitting a set of data signals to the pixels, the set of data signals comprising data signals transmitted to the white sub-pixel; and a control unit which controls the white sub-pixel to be in a dark state when the data signal chip transmits a predetermined set of data signals to the pixels. As such, the display substrate enables the white sub-pixel to be in a dark state so as to eliminate the adverse influence of the white sub-pixel when the white sub-pixel influences the pixel display (for example, reduces the brightness of the pixel display from the human visual sense) by the control unit.

A display substrate and a display device according to the embodiments of the present invention will be described below with reference to the drawings.

Embodiment 1

The present embodiment provides a display substrate, comprising a plurality of pixels 1, a data signal chip 2, and a control unit 3, as illustrated in FIG. 1. Each of the pixels 1 (only one pixel is illustrated in FIG. 1, but the display substrate may actually comprise a plurality of pixels) comprises a white sub-pixel 14; a data signal chip 2 for transmitting a set of data signals to the pixels 1, the set of data signals comprising data signals transmitted to the white sub-pixel 14; and a control unit 3 which controls the white sub-pixel 14 to be in a dark state when the data signal chip 2 transmits the predetermined set of data signals to the pixels 1.

Figure 2:
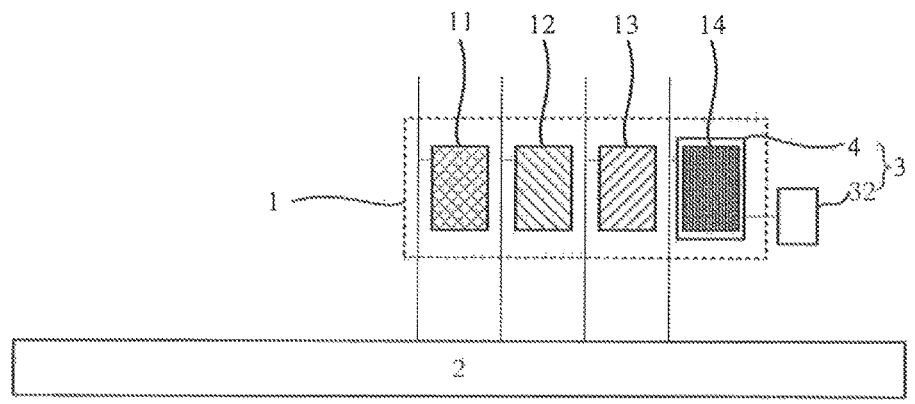
FIG. 2 is a structural schematic view of a display substrate according to another embodiment of the present invention.

In the display substrate according to the present embodiment, when the data signal chip 2 transmits a predetermined set of data signals to the pixels 1, the control unit 3 can control the white sub-pixel 14 to be in a dark state, as illustrated in FIG. 2, so as to prevent the white sub-pixel 14 from emitting white light which will visually affect the mixed color light emitted by the pixels 1, thereby ensuring the user's viewing effect and improving the product display quality. It should be noted that the predetermined set of data signals may be set depending upon the set of data signals when the white sub-pixel causes the color coordinate corresponding to the color perceived by the human eye to be different from the color coordinate corresponding to the color light emitted by the pixel comprising the white sub-pixel in the actual case.

For example, as illustrated in FIG. 1, the display substrate comprises a plurality of pixels 1, each of the pixels 1 (only one pixel is illustrated in FIG. 1, but the display substrate may actually comprise a plurality of pixels) comprising a red sub-pixel 11, a green sub-pixel 12, a blue sub-pixel 13, and a white sub-pixel 14. The display substrate may further comprise: a data signal chip 2 for transmitting data signals to the red sub-pixel 11, the green sub-pixel 12, the blue sub-pixel 13, and the white sub-pixel 14, respectively, and a control unit 3; when the pixels 1 receive a predetermined set of data signals (the combination of the data signals respectively received by the red sub-pixel 11, the green sub-pixel 12, the blue sub-pixel 13 and the white sub-pixel 14 which are predetermined), the red sub-pixel 11, the green sub-pixel 12, and the blue sub-pixel 13 emit mixed color light (for example, light green light, yellow light or light blue light), and the white sub-pixel emits white light which causes the brightness of the mixed color light seen by the human eye to be a preset percentage (for example, the preset percentage is greater than 5%) less than the actual brightness of the mixed color light. In this case, the control unit 3 controls the white sub-pixel 14 to be in a dark state upon (detecting or acquiring) the data signal chip 2 transmitting the predetermined set of data signals to the pixels 1.

In the display substrate according to the present embodiment, because the white light emitted by the white sub-pixel has a visual influence on the mixed color light emitted by the red sub-pixel, the green sub-pixel and the blue sub-pixel when the pixels receive a predetermined set of data signals, for example, when the mixed color light is yellow light with a brightness of 200 nit, the brightness of the yellow light as perceived by the user is 180 nit due to the white light emitted by the white sub-pixel, which causes the color of the yellow light as perceived by the human eye to be 10% less than the brightness of the yellow light actually emitted by the pixel. Therefore, the white sub-pixel 14 can be controlled to be in a dark state when the data signal chip 2 transmits the predetermined set of data signals to the pixels 1, as illustrated in FIG. 2, so as to prevent the white sub-pixel from emitting white light which will visually affect the mixed color light emitted by the red sub-pixel 11, the green sub-pixel 12 and the blue sub-pixel 13, thereby ensuring the user's viewing effect and improving the product display quality. It should be noted that the present invention has been described with reference to the RGBW (red, green, blue, white) structural pixel of the present embodiment. Apparently, the embodiments of the present invention include, but are not limited to the above case, and the pixel may adopt other structures comprising white sub-pixels.

For example, in the display substrate according to the example of the present Embodiment 1, as illustrated in FIG. 2, the control unit comprises: an electrochromic cell 4 disposed corresponding to the white sub-pixel (for example, disposed below or above the white sub-pixel); and a control chip for acquiring the signals transmitted to the pixels by the data signal chip, and controlling the electrochromic cell to be in an opaque state if the signals transmitted are the predetermined set of data signals.

Thus, the present embodiment can utilize the electrochromic characteristics of the electrochromic cell to change the light transmittance of the electrochromic cell, for example, when the electrochromic cell is controlled to be in an opaque state, the white sub-pixel can be ensured to be in a dark state.

For example, the electrochromic cell may be the same as the white sub-pixel in terms of shape and size. Apparently, the embodiments of the present invention include, but are not limited to the above case. The electrochromic cell can also be slightly larger than the white sub-pixel.

For example, the shape of the electrochromic cell may be different from that of the white sub-pixel, so long as the electrochromic cell can change the gray scale of the white sub-pixel by changing the color so that the white sub-pixel is in a dark state. No limitation will be made in the embodiments of the present invention.

It should be noted that the opaque state as referred to in the embodiments means that no light passes, where the dark state includes the cases where little light passes and no light passes.

For example, the control unit controls the electrochromic layer to be in a transparent state if the detected signals transmitted to the pixels by the data signal chip are not the predetermined set of data signals after the electrochromic layer has been maintained to be in the opaque state for a predetermined length of time. As such, when the white light emitted by the white sub-pixel does not visually affect the mixed color light emitted by the red sub-pixel, the green sub-pixel and the blue sub-pixel, the electrochromic cell is controlled to be in a transparent state so that the white sub-pixel can function normally.

Figure 3:
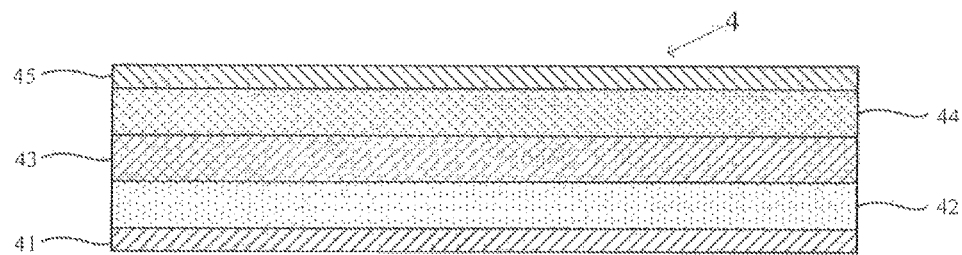
FIG. 3 is a structural schematic view of an electrochromic cell according to an embodiment of the present invention.

For example, in the display substrate according to the example of the present Embodiment 1, as illustrated in FIG. 3, the electrochromic cell 4 comprises: a first electrode layer 41, an ion storage layer 42 disposed on the first electrode layer 41, an electrolyte layer 43 disposed on the ion storage layer 42, an electrochromic layer 44 disposed on the electrolyte layer 43, and a second electrode layer 45 disposed on the electrochromic layer 44.

For example, the electrochromic layer may be made of an inorganic electrochromic material or an organic electrochromic material.

For example, the inorganic electrochromic material comprises tungsten trioxide ($WO_3$).

For example, the organic electrochromic material comprises polythiophenes and derivatives thereof, viologens, tetrathiafulvalenes, metal phthalocyanine compounds and the like.

In the display substrate according to the present embodiment, the electrochromic layer may be disposed under the white sub-pixel. In addition, the electrochromic layer may have the structure in the present embodiment, or a structure opposite to that of the present embodiment, i.e., it comprises a second electrode layer, an electrochromic layer, an electrolyte layer, an ion storage layer, and a first electrode layer sequentially from the bottom to the top, where no limitation will be made in the embodiments of the present invention.

For example, if the signals transmitted to the pixels by the data signal chip are the predetermined set of data signals, the control unit applies a forward current to the first electrode layer and the second electrode layer so that the electrochromic layer is in an opaque state, and if the detected signals transmitted to the pixels by the data signal chip are not the predetermined set of data signals after the electrochromic layer has been maintained to be in the opaque state for a predetermined length of time, the control unit applies a reverse current to the first electrode layer and the second electrode layer so that the electrochromic layer is in a transparent state.

It should be noted that if the control unit applies a forward current (i.e., the current direction is anode to cathode) to the first electrode layer and the second electrode layer, the ions in the ion storage layers will be allowed to pass through the ion conductive layer into the electrochromic layer, which leads to discoloration of the electrochromic material, thereby changing the transmittance of the electrochromic cell to be in a transparent state. If the control unit applies a reverse current (i.e., the current direction is cathode to anode) to the first electrode layer and the second electrode layer, the ions in the electrochromic layer will be allowed to pass through the ion conductive layer into the ion storage layer, which enables the electrochromic cell to resume its opaque state, thereby maintaining the electrochromic material in an opaque state by not supplying any electricity to the two electrodes.

Figure 4:
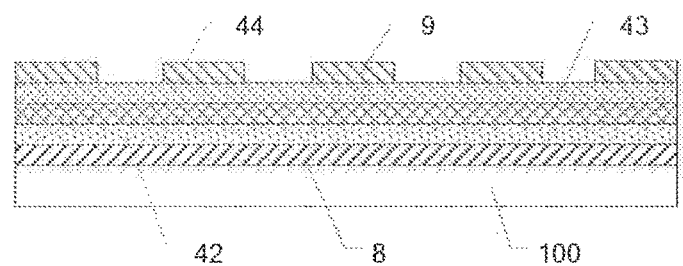
FIG. 4 is a cross-sectional schematic view of a display substrate according to an embodiment of the present invention.

For example, in the display substrate according to the example of the present Embodiment 1, as illustrated in FIG. 4, the white sub-pixel further comprises: a base substrate 100, a pixel electrode 8 and a common electrode 9 provided on the base substrate 100, wherein the ion storage layer 42 is disposed on the pixel electrode 8, the electrolyte layer 43 is disposed on the ion storage layer 42, the electrochromic layer 44 is disposed on the electrolyte layer 43, and the common electrode 9 is disposed on the electrolyte layer 43.

For example, the pixel electrode is also used as the first electrode layer. i.e., the pixel electrode can be simultaneously used as the first electrode layer, and the common electrode is also used as the second electrode layer, i.e., the common electrode can be simultaneously used as the second electrode layer.

In the present embodiment, both the pixel electrode and the common electrode are provided in the display substrate and are suitable for ADS and IPS structures. Thus, the pixel electrode and the common electrode can be used as the first electrode layer and the second electrode layer of the electrochromic cell, respectively, so that the first electrode layer and the second electrode layer need not be formed additionally, which simplifies the manufacturing process.

Figure 5:
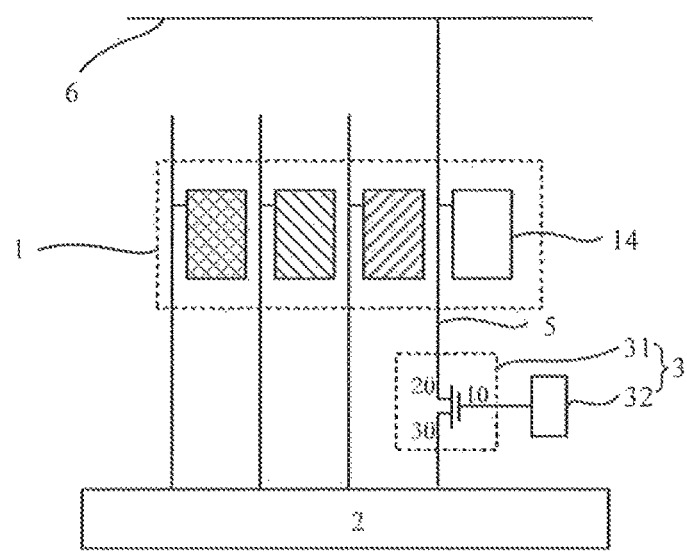
FIG. 5 is a structural schematic view of a display substrate according to another embodiment of the present invention.

For example, as illustrated in FIG. 5, the control unit 3 comprises: a switch unit 31 (FIG. 4 merely illustrates the case in which the switch unit is a transistor; in fact, the switch unit 31 can also use diode as a switch unit) provided on a data line 5 between the data signal chip 2 and the white sub-pixel 14, for example, it can be provided on a side of the data line 5 adjacent to a common electrode line 6 or on a side of the data line 5 adjacent to the data signal chip 2; and a control chip 32 for detecting the signals transmitted to the pixels 1 by the data signal chip 2, and controlling the switch unit 31 to be turned off if the signals transmitted are the predetermined set of data signals.

In the present embodiment, by controlling the bright and dark states of the white sub-pixel, the switch unit has a simple structure which is easy to set. When the switch unit is controlled to be turned off, the white sub-pixel will be maintained in a dark state because it cannot receive data signals.

For example, the control unit controls the switch unit to be turned on if the signals transmitted to the pixels by the data signal chip are not the predetermined set of data signals after the control unit has controlled the switch unit to be turned off for a predetermined period of time.

Based on the present embodiment, when the white light emitted by the white sub-pixel does not visually affect the mixed color light emitted by the red sub-pixel, the green sub-pixel and the blue sub-pixel, the white sub-pixel can be controlled to emit normally so as to function normally.

For example, the switch unit comprises a thin film transistor 31 whose gate electrode 10 is connected to a control unit (control chip), and whose source electrode 20 and drain electrode 30 are connected to a white sub-pixel 14 and a data signal chip 2, respectively. The thin film transistor has a simple structure which is easy to set, and can be formed together with the formation of the driving transistor in the pixel, thereby simplifying the manufacturing process.

Figure 6:
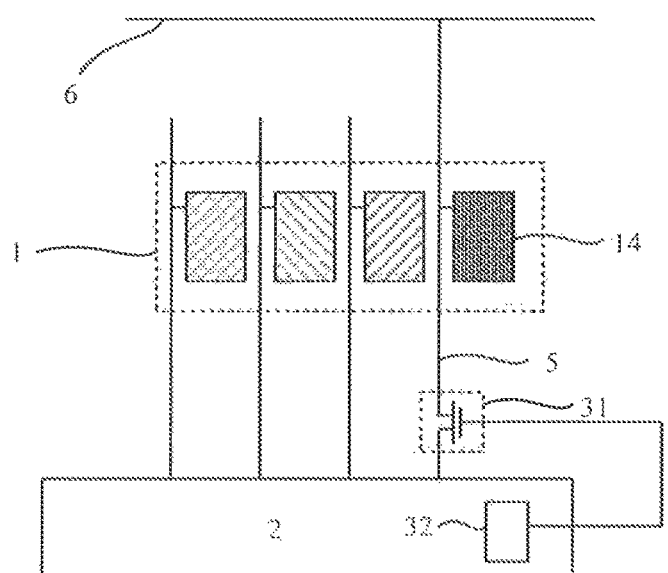
FIG. 6 is a structural schematic view of a display substrate according to another embodiment of the present invention.

For example, as illustrated in FIG. 6, the control chip 32 is integrated in the data signal chip 2. Because the data signal chip 2 is generally provided in a peripheral circuit, the integration of the control chip 32 in the data signal chip 2 can reduce the occupancy of the effective light-emitting area of the display substrate, thereby increasing the aperture ratio.

For example, the red sub-pixel, the green sub-pixel, and the blue sub-pixel emit mixed color light including light green light, yellow light or light blue light when the pixels receive a predetermined set of data signals. For example, when the mixed color light is yellow light, the white light emitted by the white sub-pixel has the greatest influence on the viewing effect of the user, and the visual effect of the user can be significantly improved by the technical solution described above.

Embodiment 2

The present embodiment provides a display device, comprising the above display substrate.

It should be noted that the display device in the present embodiment can be: any product or component having display function such as electronic paper, a mobile phone, a tablet, a TV set, a laptop, a digital photo frame, a navigator or the like.

Embodiment 3

The present embodiment provides a driving method of a display substrate, wherein the display substrate comprises: a plurality of pixels, each of the pixels comprising a white sub-pixel, a data signal chip for transmitting a set of data signals to the pixels, and a control unit, and the driving method comprises controlling the white sub-pixel to be in a dark state by the control unit when the data signal chip transmits a predetermined set of data signals to the pixels, thereby preventing the white sub-pixel from emitting white light which will visually affect the mixed color light emitted by the pixel, so as to ensure the user's viewing effect and improve the product display quality. It should be noted that the predetermined set of data signals may be set depending upon the set of data signals when the white sub-pixel causes the color coordinate corresponding to the color perceived by the human eye to be different from the color coordinate corresponding to the color light emitted by the pixel comprising the white sub-pixel in the actual case.

For example, in the driving method according to an example of the present embodiment, when the pixels receive a predetermined set of data signals, the pixels emit mixed color light, and the white sub-pixel emits white light which causes the brightness of the mixed color light seen by the human eye to be less than the actual brightness of the mixed color light by a preset percentage.

For example, each of the pixels further comprises a red sub-pixel, a green sub-pixel, and a blue sub-pixel, and the set of data signals further comprises data signals transmitted to the red sub-pixel, the green sub-pixel and the blue sub-pixel, respectively. When the pixels receive a predetermined set of data signals, the red sub-pixel, the green sub-pixel and the blue sub-pixel emit mixed color light, and the white sub-pixel emits white light which causes the brightness of the mixed color light seen by the human eye to be a preset percentage less than the actual brightness of the mixed color light.

For example, in the driving method according to an example of the present embodiment, the preset percentage includes 5%.

The technical solution of the present invention has been described above in detail with reference to the accompanying drawings. In the related art, the white light emitted by the white sub-pixel will visually affect certain kinds of mixed color light emitted by the red sub-pixel, the green sub-pixel and the blue sub-pixel. Based on the technical solution of the present invention, when the chip transmits a predetermined set of data signals to the pixels, the visual influence of the white sub-pixel on the mixed color light emitted by the red sub-pixel, the green sub-pixel and the blue sub-pixel can be avoided by controlling the white sub-pixel to be in a dark state, thereby ensuring the user's viewing effect.

The above are merely exemplary embodiments of the present invention, and are not intended to limit the scope of protection of the present invention. Any change or substitution that can be readily conceived of by a person of ordinary skill in the art within the technical scope of the present invention shall be covered within the scope of protection of the present invention. Therefore, the scope of protection of the present invention shall be determined by the scope of protection of the claims.

The present application claims the priority of the Chinese patent application No. 201610009564.0 submitted on Jan. 8, 2016, and the content disclosed in the above Chinese patent application is incorporated herein by reference as part of the present application.

The invention claimed is:

1. A display substrate comprising:
   a plurality of pixels, wherein each of the pixels comprises a white sub-pixel;
   a data signal chip configured to transmit a set of data signals to the pixels, the set of data signals comprising a data signal transmitted to the white sub-pixel; and
   a control unit which controls the white sub-pixel to be in a dark state upon the data signal chip transmitting a predetermined set of data signals to the pixels.

2. The display substrate according to claim 1, wherein each of the pixels further comprises a red sub-pixel, a green sub-pixel, and a blue sub-pixel, and the set of data signals further comprises data signals transmitted to the red sub-pixel, the green sub-pixel, and the blue sub-pixel.

3. The display substrate according to claim 2, wherein, upon the pixels receiving the predetermined set of data signals, the red sub-pixel, the green sub-pixel, and the blue sub-pixel emit mixed color light, and the white sub-pixel emits white light which causes the brightness of the mixed color light seen by a human eye to be less than an actual brightness of the mixed color light by a preset percentage.

4. The display substrate according to claim 3, wherein the preset percentage includes 5%.

5. The display substrate according to claim 2, wherein the red sub-pixel, the green sub-pixel, and the blue sub-pixel emit mixed color light including light green light, yellow light or light blue light upon the pixels receiving the predetermined set of data signals.

6. The display substrate according to claim 1, wherein the control unit comprises:
   an electrochromic cell disposed corresponding to the white sub-pixel; and
   a control chip for acquiring the set of data signals transmitted to the pixels by the data signal chip, and controlling the electrochromic cell to be in an opaque state if the set of data signals is the predetermined set of data signals.

7. The display substrate according to claim 6, wherein the electrochromic cell has a same shape and a same size as the white sub-pixel.

8. The display substrate according to claim 6, wherein the control unit controls the electrochromic cell to be in a transparent state if the acquired set of data signals transmitted to the pixels by the data signal chip is not the predetermined set of data signals after the electrochromic cell has been maintained to be in the opaque state for a predetermined period of time.

9. The display substrate according to claim 6, wherein the electrochromic cell comprises:
- a first electrode layer;
- an ion storage layer disposed on the first electrode layer;
- an electrolyte layer disposed on the ion storage layer;
- an electrochromic layer disposed on the electrolyte layer; and
- a second electrode layer disposed on the electrochromic layer.

10. The display substrate according to claim 9, wherein,
upon the set of data signals transmitted to the pixels by the data signal chip being the predetermined set of data signals, the control unit applies a forward current to the first electrode layer and the second electrode layer so that the electrochromic layer is in an opaque state, and
upon the acquired set of data signals transmitted to the pixels by the data signal chip being not the predetermined set of data signals after the electrochromic layer has been maintained to be in the opaque state for a predetermined period of time, the control unit applies a reverse current to the first electrode layer and the second electrode layer so that the electrochromic layer is in a transparent state.

11. The display substrate according to claim 9, wherein the white sub-pixel comprises:
- a pixel electrode and a common electrode,
- wherein the ion storage layer is disposed on the pixel electrode, the electrolyte layer is disposed on the ion storage layer, the electrochromic layer is disposed on the electrolyte layer, and the common electrode is disposed on the electrolyte layer.

12. The display substrate according to claim 11, wherein the pixel electrode is also used as the first electrode layer, and the common electrode is also used as the second electrode layer.

13. The display substrate according to claim 6, wherein the control chip is integrated in the data signal chip.

14. The display substrate according to claim 1, wherein the control unit comprises:
- a switch unit provided on a data line between the data signal chip and the white sub-pixel; and
- a control chip configured for detecting the set of data signals transmitted to the pixels by the data signal chip, and controlling the switch unit to be turned off if the set of data signals is the predetermined set of data signals.

15. The display substrate according to claim 14, wherein the control unit controls the switch unit to be turned on if the set of data signals transmitted to the pixels by the data signal chip is not the predetermined set of data signals after the control unit has controlled the switch unit to be turned off for a predetermined period of time.

16. The display substrate according to claim 14, wherein the switch unit comprises:
- a thin film transistor comprising a gate electrode, a source electrode and a drain electrode,
- wherein the gate electrode is connected to the control chip, and the source electrode and the drain electrode are respectively connected to the white sub-pixel and the data signal chip.

17. A display device, comprising the display substrate according to claim 1.

18. A driving method of a display substrate, wherein the display substrate comprises: a plurality of pixels, each of the pixels comprising a white sub-pixel; a data signal chip for transmitting a set of data signals to the pixels; and a control unit,
the driving method comprising controlling the white sub-pixel to be in a dark state by the control unit upon the data signal chip transmitting a predetermined set of data signals to the pixels.

19. The driving method according to claim 18, wherein, upon the pixels receiving the predetermined set of data signals, the pixels emit mixed color light, and the white sub-pixel emits white light which causes a brightness of the mixed color light seen by a human eye to be less than an actual brightness of the mixed color light by a preset percentage.

20. The driving method according to claim 19, wherein the preset percentage includes 5%.

\* \* \* \* \*